United States Patent
Jones et al.

(10) Patent No.: US 6,860,693 B2
(45) Date of Patent: Mar. 1, 2005

(54) RAPID FASTENING SCREW APPARATUS AND METHOD

(75) Inventors: Christopher A. Jones, Austin, TX (US); Christopher Beall, Pflugerville, TX (US); Alan Ifft, Highland, IL (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/366,748

(22) Filed: Feb. 14, 2003

(65) Prior Publication Data

US 2004/0161317 A1 Aug. 19, 2004

(51) Int. Cl.⁷ .......................... F16B 37/08; F16B 37/16
(52) U.S. Cl. ................. 411/433; 411/432; 411/437; 411/227; 29/525.11
(58) Field of Search .............................. 411/338, 339, 411/432, 433, 437, 227, 234, 247; 29/525.11

(56) References Cited

U.S. PATENT DOCUMENTS

| | | | | |
|---|---|---|---|---|
| 1,589,307 A | * | 6/1926 | SveGilius | 411/433 X |
| 1,920,792 A | * | 8/1933 | Hotchkin | 411/167 |
| 2,566,593 A | * | 9/1951 | Bloomfield | 411/520 |
| 2,712,262 A | * | 7/1955 | Knohl | 411/521 |
| 3,878,757 A | * | 4/1975 | Puklus, Jr. | 411/433 X |
| 4,139,038 A | * | 2/1979 | Haussermann | 411/247 |
| 4,911,594 A | * | 3/1990 | Fisher | 411/437 |
| 5,081,811 A | * | 1/1992 | Sasaki | 411/433 X |
| 5,340,252 A | * | 8/1994 | Weddendorf | 411/433 X |
| 5,551,817 A | * | 9/1996 | Kanie | 411/433 X |
| 5,558,481 A | * | 9/1996 | Park | 411/433 |
| 5,700,121 A | * | 12/1997 | Minola | 411/432 |
| 5,782,597 A | * | 7/1998 | Meyer | 411/433 |
| 5,816,762 A | * | 10/1998 | Miura et al. | 411/433 |
| 5,865,582 A | | 2/1999 | Ellis et al. | 411/353 |
| 6,250,524 B1 | | 6/2001 | Maruyama | 224/42.24 |
| 6,280,131 B1 | * | 8/2001 | Ellis et al. | 411/353 |
| 6,468,012 B2 | | 10/2002 | Ellis et al. | 411/353 |
| 6,762,932 B2 | * | 7/2004 | Regimbal et al. | 361/683 |

* cited by examiner

Primary Examiner—Robert J. Sandy
Assistant Examiner—Katherine Mitchell
(74) Attorney, Agent, or Firm—Hamilton & Terrile LLP; Robert W. Holland (57) ABSTRACT

A press-in fastening apparatus and method couples a screw with a nut by pushing the screw through an opening of the nut along a slip axis and rotating the nut to align a lock axis with the inserted screw. The opening of the nut along the slip axis has a diameter greater than the diameter of the screw and the opening of the nut along the lock axis has a diameter that engages screw threads with nut threads. In one embodiment, the nut is disposed in a housing coupled to an information handling system and biased to align with the lock axis so that a module is secured to the information handling system by aligning a screw coupled to the module with the nut and pushing the screw into the nut. The module is removed from the information handling system by unscrewing the screw with engagement of the screw threads and nut threads.

1 Claim, 8 Drawing Sheets

RAPID FASTENING SCREW APPARATUS AND METHOD

BACKGROUND OF THE INVENTION

1. Field of the Invention

The present invention relates in general to the field of fasteners, and more particularly relates to a rapid fastening screw apparatus and method.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One difficulty with information handling systems is that a generally large number of components are typically assembled in a relatively small housing to manufacture an information handling system. A considerable amount of time is spent during the manufacture of an information handling system to fasten components together with screws. For instance, nuts are often coupled to a component, such as a chassis, for accepting a screw that passes through another component, such as a motherboard, in order to secure the components together. Screw and nut coupling is often required over other coupling techniques to satisfy mechanical shock and vibration requirements and to satisfy the certification requirements of standards bodies. For instance, tool-access to electronic components is required by some standards bodies to limit the risk that users will contact live or active components in a manner that poses an electric shock hazard. This restricts the utility of a number of hot swappable modules available for use in information handling systems. Hot swappable modules are insertable into and removable from an information handling system while the information handling system is operable with power applied. A typical information handling system may have six or more modules that are secured in place with captive screws and mating press-in nuts.

One way to decrease assembly time for information handling systems is to use rapid fastening nuts such as are used in the assembly of automotive and household appliance products. However information handling systems typically do not adapt to the use of available rapid fastening nuts due to the smaller size, compressed mounting scheme and grounding requirements of information handling systems. For instance, in electronic enclosures, boards are secured to a chassis with captive screws that insert into mated nuts in order to reduce the risk that a loose, misplaced or lost fastener will cause damage to electronic components, such as shorting out components. One available technique for securing two devices is to use captive screws with extruded holes in sheet metal and into press-in hardware. For example, an extrusion in sheet metal is either tapped to form threads or a screw is inserted and tightened to form threads. Tapped extruded holes generally lack the endurance for use with components that are subjected to multiple accesses, such as hot swappable modules. Another available technique for securing two devices is to use press-in or self-clenching nuts. Press-in nuts are secured to one device by pressing the nut into the device, and self-clenching nuts are secured into the device as a screw tightens in the nut to pull the nut against the device. Although press-in and self-clenching nuts embedded in a board or sheet metal have greater endurance to withstand multiple accesses, coupling devices to press-in and self-clenching nuts generally requires that the screws are rotated within the nut to secure devices together and release devices from each other.

SUMMARY OF THE INVENTION

Therefore a need has arisen for an apparatus and method for coupling devices together with a press-in motion to secure the devices and an unscrewing motion to separate the devices.

In accordance with the present invention, an apparatus and method are provided which substantially reduce the disadvantages and problems associated with previous apparatus and methods for fastening devices together. A rapid fastening, screw out coupling apparatus secures to a screw pushed through the coupling apparatus without a need for rotation of the screw and prevents removal of the screw from the coupling apparatus unless the screw is rotated. In one embodiment, the coupling apparatus accepts the screw by rotating a nut to a slip position that aligns a slip opening axis of the nut with the screw for insertion and secures the inserted screw to the nut by rotating the nut to a lock position that aligns a lock opening axis with the screw to engage the screw with threads aligned along the lock opening axis. In another embodiment, the coupling apparatus accepts the screw through a nut having spring-loaded threads that flex from a locking position to a slip position to allow insertion of a screw and that press against the threads of an inserted screw to prevent removal of the screw without rotation. Thus, the coupling apparatus secures first and second devices with a push-in motion of a screw through a nut and releases devices by unscrewing the screw to rotationally engage screw threads with nut threads.

More specifically, in one embodiment, a nut is fabricated with a slip opening having a diameter greater than a screw along a slip axis and a lock opening having a diameter and threads that engage the threads of an inserted screw. The slip axis and lock axis are offset so that rotation of the nut determines whether the screw slips through the nut or engages the nut threads. The nut is disposed in a housing and biased by a biasing mechanism, such as a spring element, to a lock position in which the lock axis aligns with the axis through which a screw is inserted into the housing. As a screw is inserted into the lock opening, the screw threads push against the nut threads to overcome the bias force and rotate the nut to a slip position in which the slip axis aligns with the screw insertion axis. Once the screw is inserted through the slip opening, the biasing mechanism rotates the nut to the lock position to engage the screw threads with the nut threads and restrict the screw from being pulled out of the nut. The screw may be further tightened or removed by rotational engagement of the screw threads and nut threads through turning of the screw. The nut is restricted from turning with the screw by contact between the nut and the housing. Alternatively, in another embodiment, the nut is fabricated with spring fingers that extend into a screw opening of the nut to form threads aligned to engage screw threads. The spring fingers are angled to flex when a screw is pushed into the opening so that the screw slips into the opening without rotation. The spring fingers push against and engage the threads to prevent removal of the screw without rotation.

The present invention provides a number of important technical advantages. One example of an important technical advantage is that a screw is rapidly fastened with a push-in motion that secures the screw so that an unscrewing motion is used to remove the screw. Rapid push-in fastening with a screw-out removal aids in the assembly of devices, such as electronic components, while providing a slower or tool-only disassembly. For instance, information handling systems are quickly and securely assembled to meet grounding and safety standards requirements with screws that satisfy shock and vibration limitations. As a specific example, a motherboard pressed into a chassis with the present invention is secured to the chassis by screws without a screwing motion or the use of tools. Alternatively, the motherboard is substantially secured with the press-in fastener and then tightened with less screwing motion to bring the upper surface of the nut into contact with the upper surface of the cavity. As another example, hot swappable modules are easily and quickly secured in an information handling system with a push-in motion, but removed only with a tool by adapting the screw to require a screw driver for unscrewing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A push-in, screw out fastening apparatus simplifies the securing of devices to each other with a single push-in securing method while restricting separation of the devices from each other to unscrewing of the fastening apparatus. The push-in, screw out fastening apparatus aids in assembly of hot swappable modules in an information handling system and reduces risk of electric shock from disassembly of modules while power is applied to the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
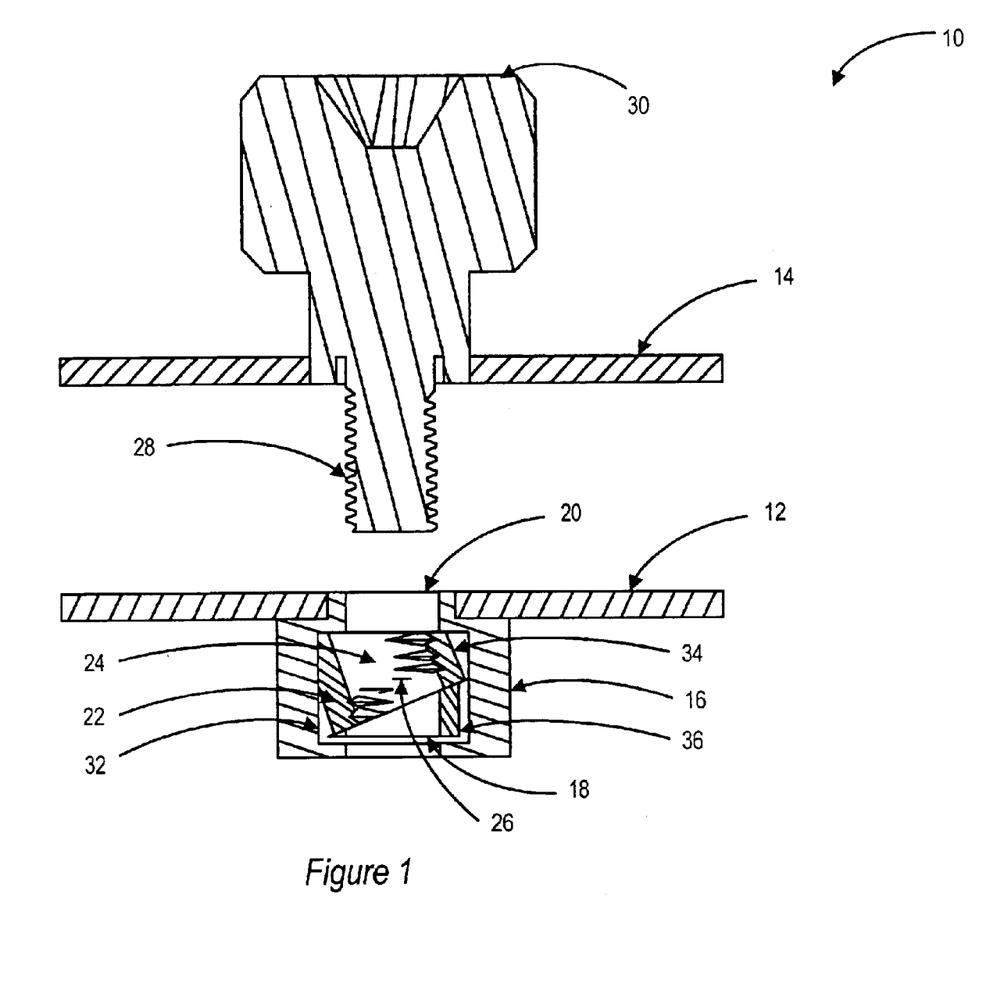
FIG. 1 depicts a side cut away view of a screw aligned to push into a fastening nut apparatus.

Referring now to FIG. 1, a side cutaway view depicts a push-in fastening apparatus 10 aligned to secure a first device 12 with a second device 14. The first device is coupled with a housing 16 defining a cavity 18 aligned with a opening 20 in device 12. A nut 22 is disposed in cavity 18 with a screw opening 24 aligned with opening 20 of device 12. Nut threads 26 are machined in screw opening 24 of nut 22 to engage screw threads 28 of a screw 30. Nut 22 is shaped to have a curved side 32 with a height slightly smaller than the height of cavity 18, the curved side 32 disposed to rotationally engage the cavity wall of housing 16. Opposite to curved side 32, nut 22 has a shorter side 34 with a height approximately one-half or smaller of the height of cavity 18 so that nut 22 rotates along curved side 32 to raise and lower shorter side 34. A biasing mechanism 36, such as a spring element, biases shorter side 34 upward towards the top of cavity 18.

Figure 2:
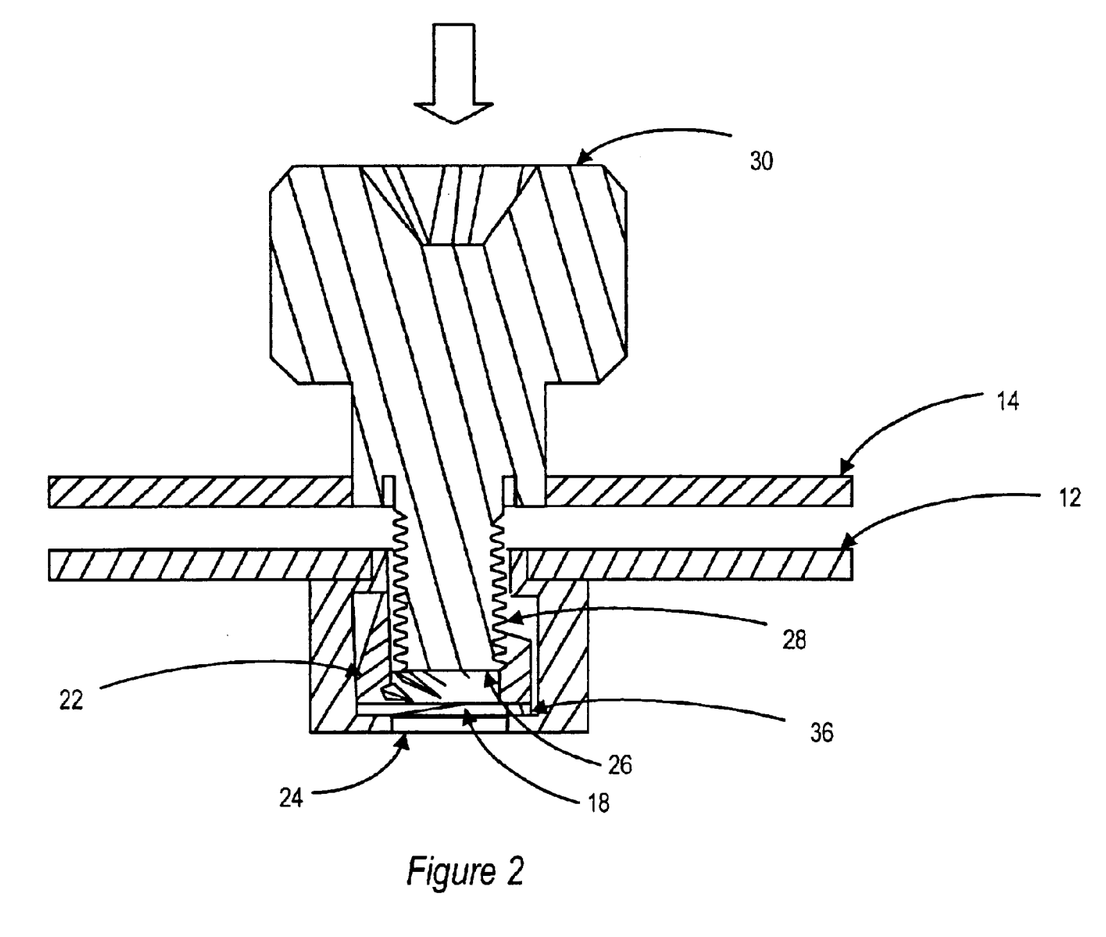
FIG. 2 depicts a side cut away view of a screw being inserted into a push-in fastening nut apparatus.
Figure 3:
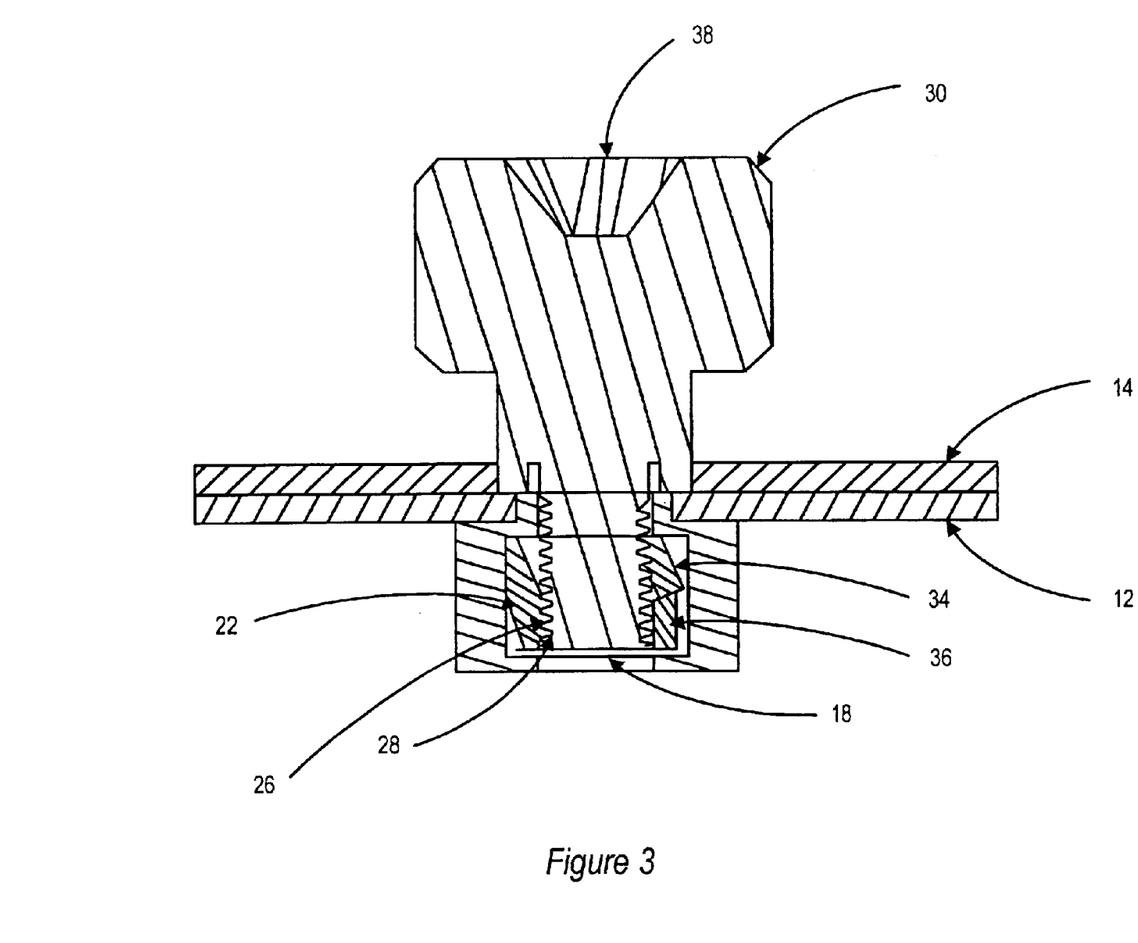
FIG. 3 depicts a side cut away view of two devices coupled together by a push-in fastening apparatus.

Referring now to FIG. 2, a side cutaway view depicts insertion of screw 30 into screw opening 24 of nut 22 to begin the securing of first device 12 and second device 14. As screw 30 is pushed into screw opening 24 of nut 22, threads 28 of screw 30 push on threads 26 on short side 34 of nut 22 to compress biasing mechanism 36, allowing nut 22 to rotate from a locking position downward towards the bottom of cavity 18 into a slip position. As screw 30 is pushed through screw opening 24, biasing mechanism 36 flexes to allow room for screw 30 to slip through screw opening 24 without requiring rotational engagement of threads 26 and 28. Biasing mechanism 36 maintains a biasing upward force against nut 22 to press threads 26 and 28 together to restrict removal of screw 30 from screw opening 24 except by rotational engagement of threads 26 and 28. Referring to FIG. 3, once device 12 and 14 are pushed together, biasing mechanism 36 pushes short side 34 of nut 22 towards the top of cavity 18 so that threads 26 and 28 engage to restrict removal of screw 30 by the pulling of screw 30 from screw opening 24 of nut 22. In order to further tighten the coupling of devices 12 and 14, screw 30 may be rotated from tool attachment point 38 so that threads 26 and 28 rotationally engage to pull nut 22 against the upper surface of cavity 18.

Figure 4:
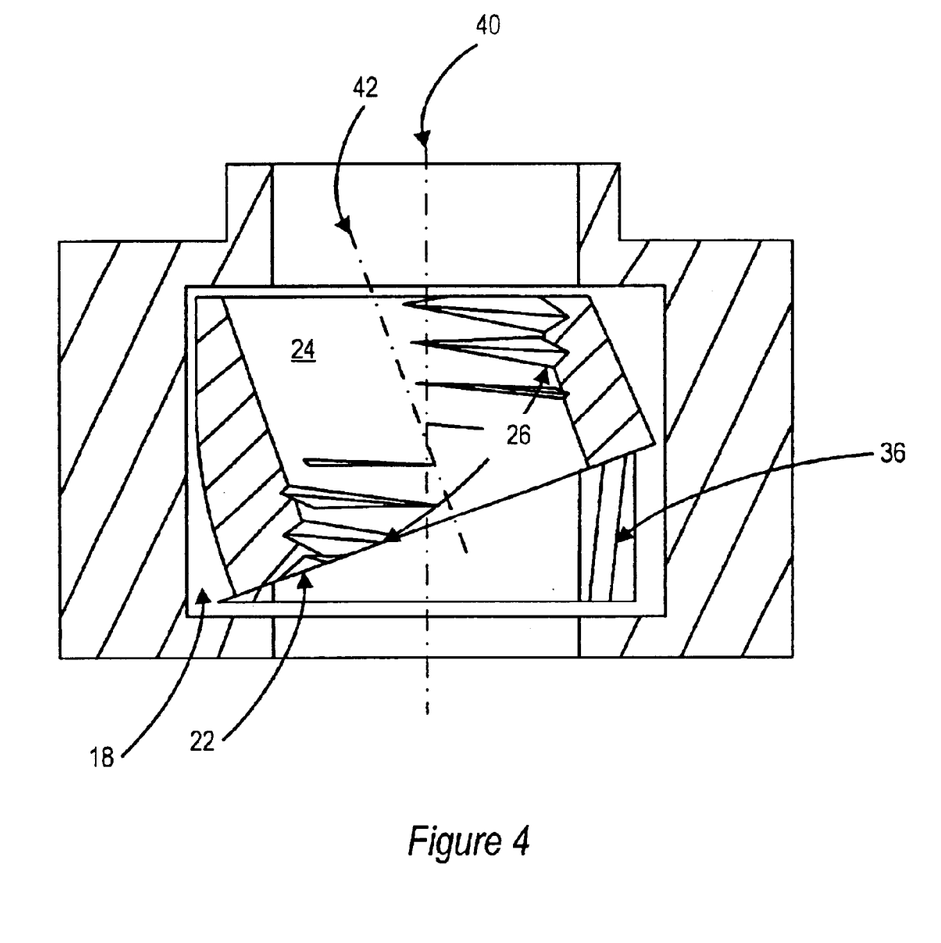
FIG. 4 depicts a side cut away view of a push-in nut apparatus in a lock position with a lock axis aligned with the screw insertion axis.
Figure 5:
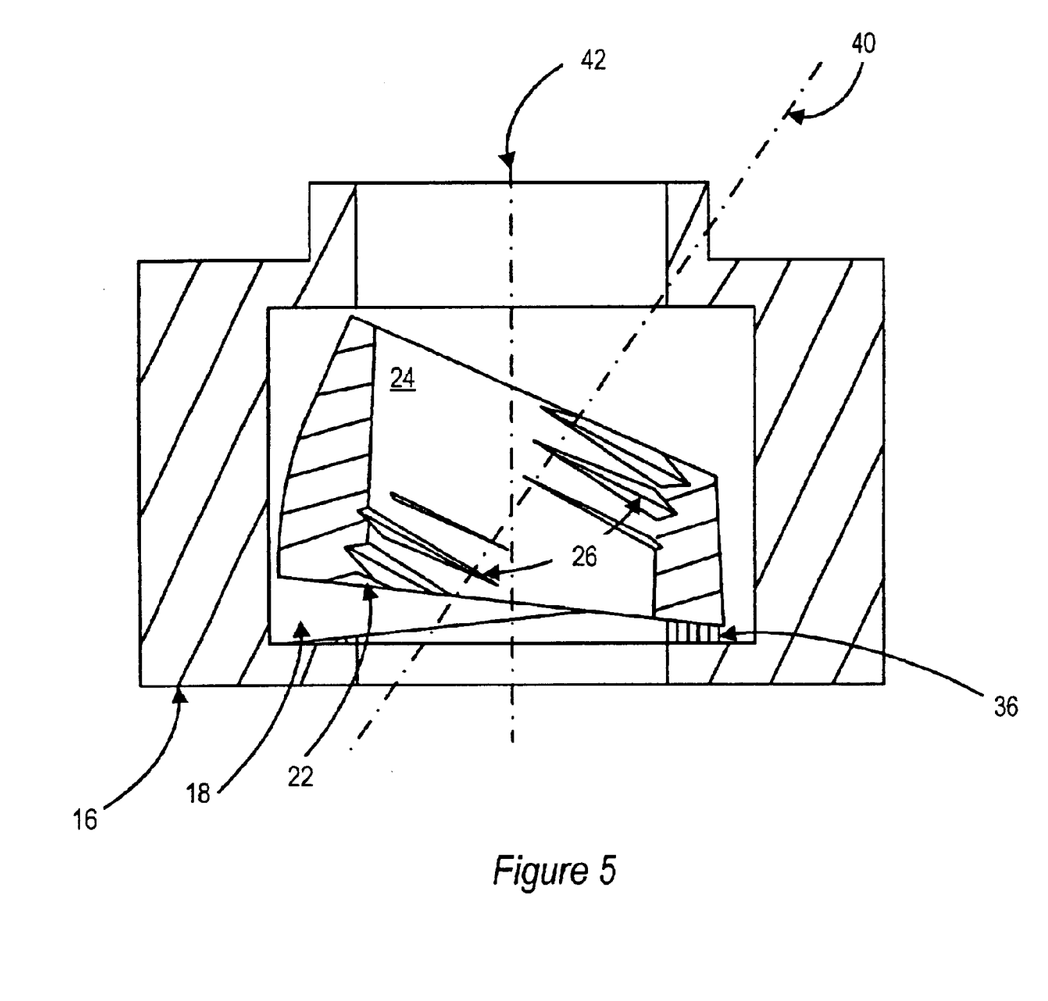
FIG. 5 depicts a side cutaway view of a push-in nut apparatus in a slip position with a slip axis aligned with the screw insertion axis.

Referring now to FIG. 4, a side cutaway view depicts nut 22 disposed in a locking position within cavity 18 with biasing mechanism 36 biasing nut 22 towards the top of cavity 18. In the locking position depicted by FIG. 4, a locking axis 40 of nut 22 aligns with the axis through which a screw inserts into screw opening 24 of nut 22. Locking axis 40 is offset from a slip axis 42. The diameter of screw opening 24 across locking axis 40 is such that threads 26 will engage with the threads of an inserted screw to restrict removal of the screw except by rotational engagement of the screw threads and nut threads 26. Referring to FIG. 5, a side cutaway view depicts nut 22 disposed in a slip position within cavity 18 with biasing mechanism 36 compressed so that nut 22 is pushed downward towards the bottom of cavity 18. In the slip position depicted by FIG. 5, slip axis 42 of nut 22 aligns with the axis through which a screw inserts into screw opening 24 of nut 22. The diameter of screw opening 24 across slip axis 42 is such that a screw will slip through opening 24 without having to engage threads 26, thus allowing a push-in insertion of the screw through opening 24. Nut 22 rotates between the lock position of FIG. 4 and the slip position of FIG. 5 approximately about the intersection of lock axis 40 and slip axis 42. Nut 22 is restricted from rotation about the screw insertion axis by shaping the sides of cavity 18 to contact nut 22.

In one embodiment, nut 22 is fabricated by drilling two holes through nut 22 at an angle to one another. A first locking hole is drilled with a diameter of the minor diameter of the screw threads and then nut tabs are tapped to engage the screw threads. The locking hole is drilled perpendicular to the upper surface of nut 22 so that when the locking axis aligns with an inserted screw, the upper surface of nut 22 mates with the upper surface of cavity 18. A second slip hole is drilled at an angle to the locking hole and with a diameter greater than the major diameter of the screw threads so that the screw will slip through the slip hole without engaging the nut threads fabricated in the locking hole. Thus, the engagement of the threads of an inserted screw is controlled by the rotation of nut 22 between the lock position and slip position.

Figure 6:
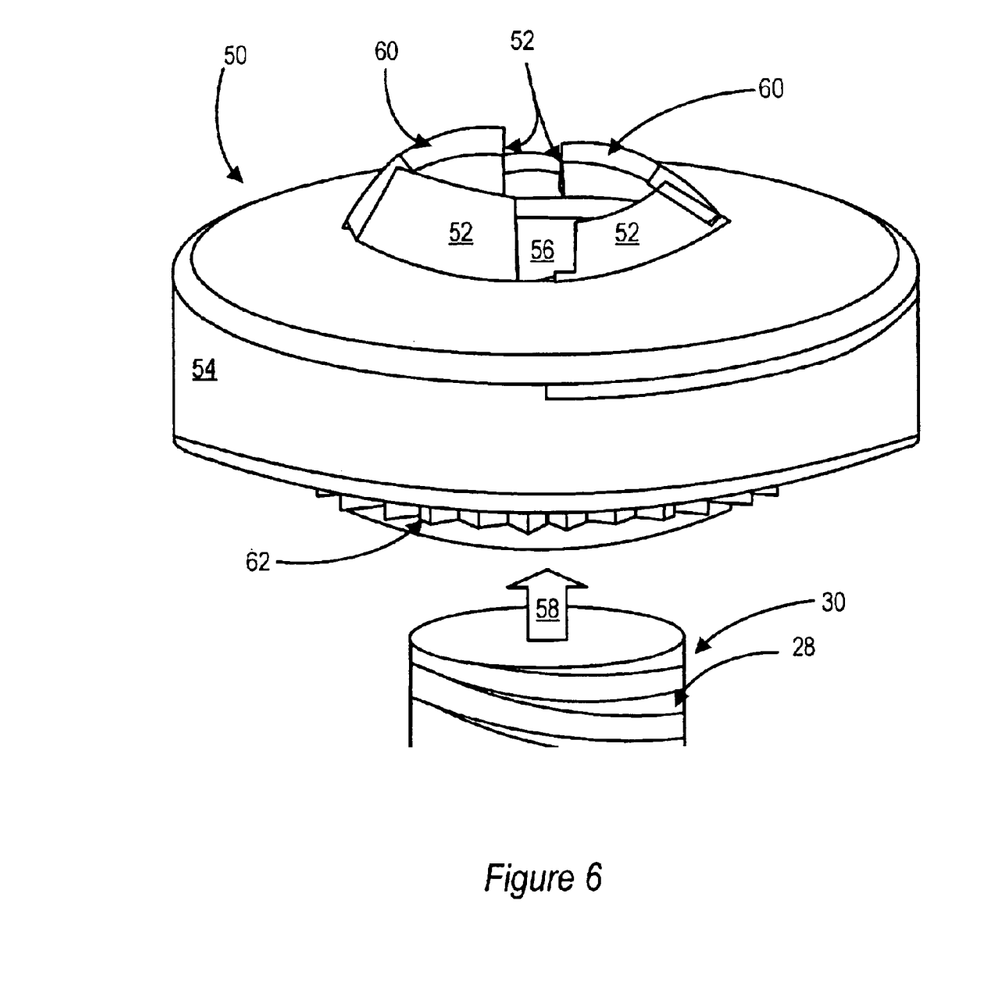
FIG. 6 depicts a side perspective view of a push-in nut apparatus with spring finger threads.

Referring now to FIG. 6, a side perspective view depicts one embodiment of a push-in screw out fastening nut 50 for rapid fastening of a screw. Four separate spring fingers 52 extend from the nut housing 54 into a screw opening 56 angled to point away from nut housing 54 along a screw insertion axis 58. The ends 60 of spring fingers 52 align to define threads to engage the threads of screw 30. That is, each spring finger end 60 is shaped with a varied height relative to nut housing 54 so that the threads 28 of screw 30 will simultaneously engage the entire length of all of the spring finger ends 60. As screw 30 is pushed along screw insertion axis 58, it pushes against ends 60 of spring fingers 52 causing the spring fingers to flex and effectively widen nut opening 56 to allow screw 30 to insert through opening 56 without a need for rotational engagement of the screw threads with spring finger ends 60. Spring fingers 52 are made of flexible and resilient material, such as high grade steel, so that pressure against the spring fingers will flex enough to increase the effective diameter of opening 56 from being substantially equal to the minor diameter of screw 30 to being substantially equal to the major diameter of screw 30. Once pressure is removed, spring fingers 52 return to their unflexed position with a diameter substantially equal to the minor diameter of screw 30. Nut housing 54 is held in position by self-clenching or press-in ridges that fixedly engage a device to couple nut housing 54 to the device.

Figure 7:
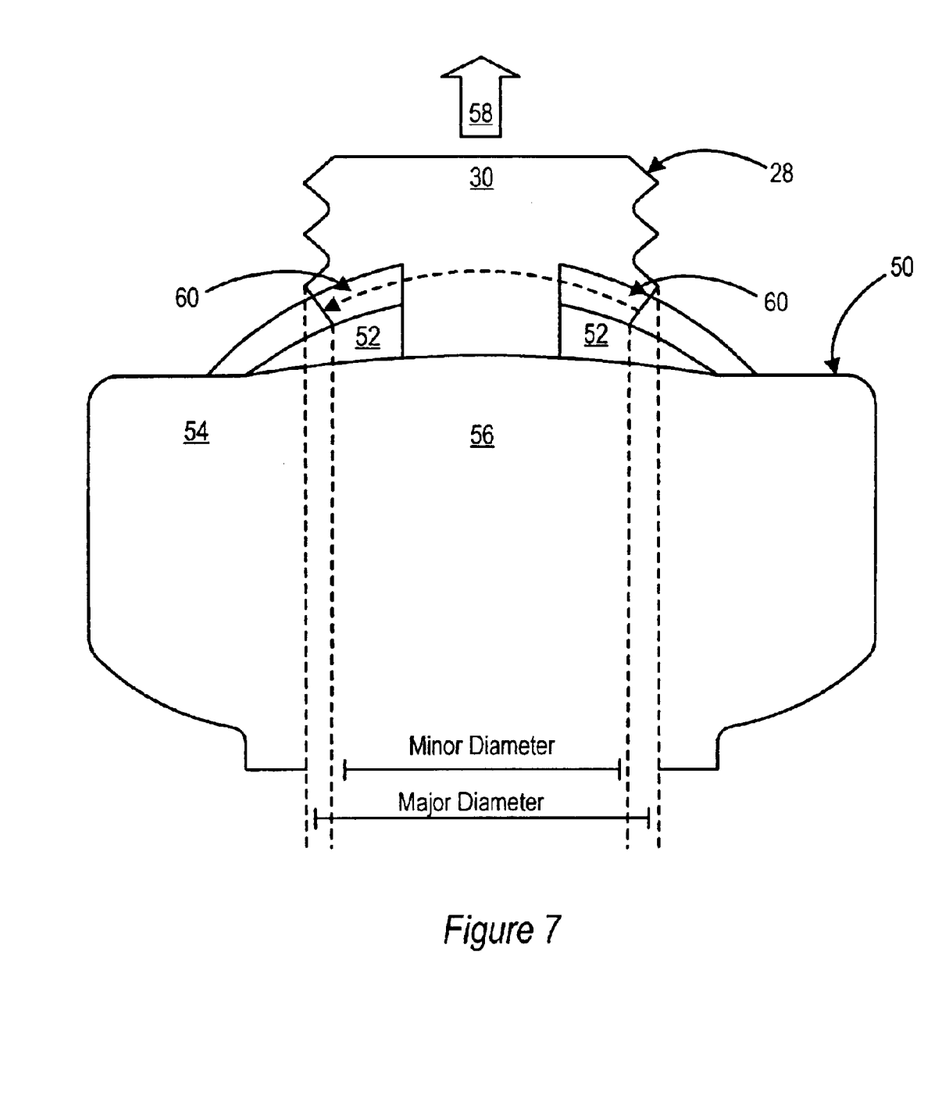
FIG. 7 depicts a side cutaway view of the push-in nut apparatus having spring fingers extended into the screw opening.

Referring now to FIG. 7, a side cutaway view of push-in fastening nut 50 depicts screw 30 inserted to engage threads 28 with spring fingers 52 in an unflexed position having a diameter approximately equal to the minor diameter of screw 30. Screw 30 is inserted further into nut housing 54 by applying pressure along the screw insertion axis 58 to push threads 28 against ends 60 and flex spring fingers 52 so that ends 60 open to a diameter of approximately the major diameter of screw 30. As spring fingers 52 flex to the major diameter, screw 30 slips through opening 56. However, spring fingers 52 are offset slightly to point in the direction of screw insertion along axis 58 so that pulling on screw 30 to attempt to remove screw 30 from opening 56 results in spring fingers 52 flexing towards the minor diameter to engage threads 28. Thus, the flexing of spring fingers 52 allows pushing in to insert a screw yet prevents pulling to extract the screw. Once a screw 30 inserts to engage threads 28 with spring fingers 52, the screw may also be inserted by rotationally engaging threads 28 with spring fingers 52 to tighten screw 30 in nut 50.

Figure 8:
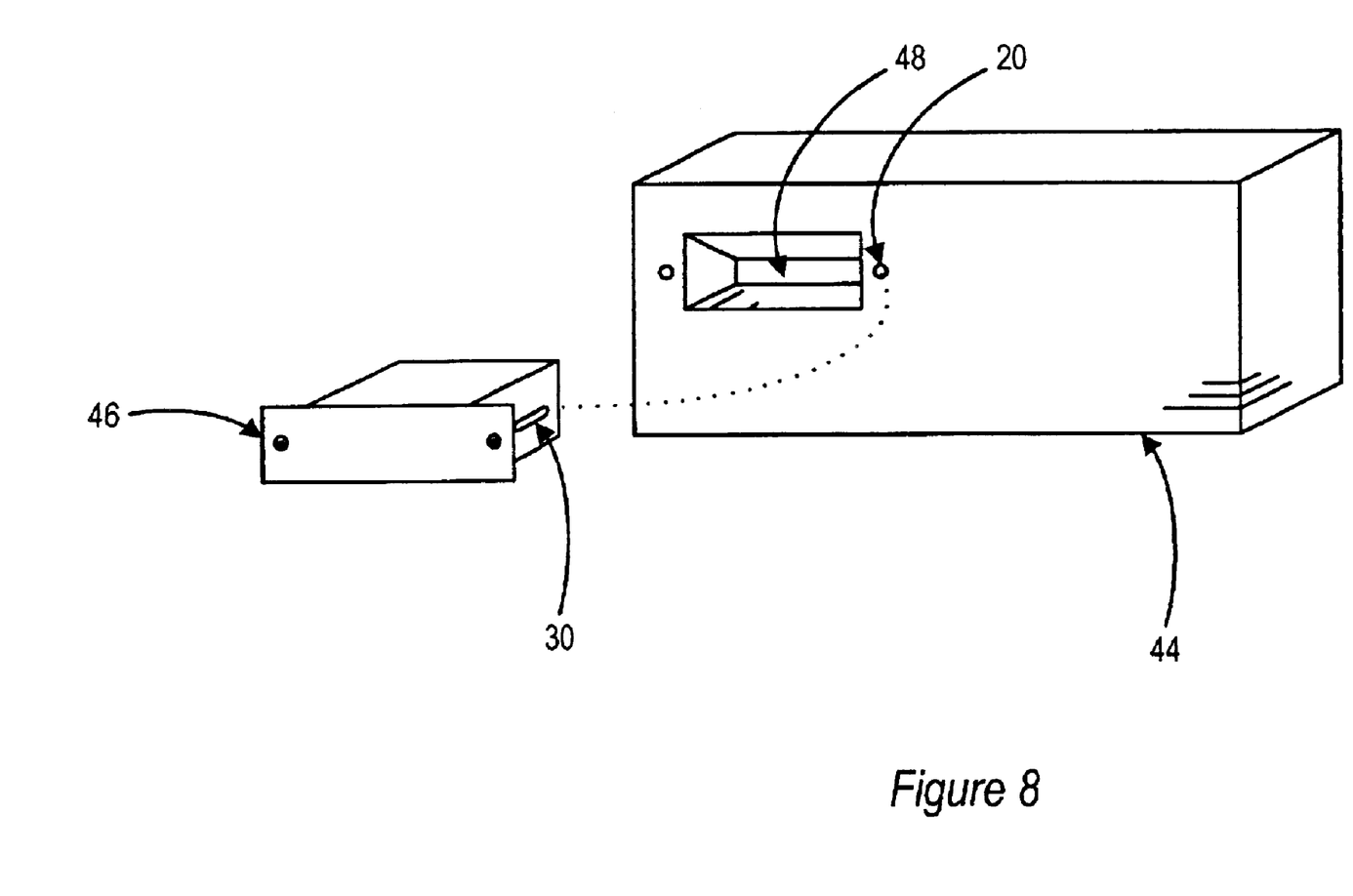
FIG. 8 depicts a blow-up view of a hot swappable module arranged to couple with an information handling system by push-in, screw out fasteners.

Referring now to FIG. 8, a blow-up view of an information handling system 44 adapted to accept a hot swappable module 46 in a module opening 48 is depicted. Hot swappable module 46 is aligned with module opening 48 so that screws 30 insert in openings 20 for push-in, screw-out nut fasteners to couple hot swappable module 46 to information handling system 44. Hot swappable module 46 is secured in module opening 48 by pushing screws 30 through openings 20 to couple with push-in screw-out nut fasteners. In order to further tighten hot swappable module 46, screws 30 are rotated to tighten the nut. To remove hot swappable module 46, screws 30 are rotated so that the screw and nut threads engage to release screw 30 from opening 20. Push-in, screw-out fasteners enhance the assembly of a variety of information handling system components and improve safety by restricting removal of electronic components to the unscrewing of the components.

Although the present invention has been described in detail, it should be understood that various changes, substitutions and alterations can be made hereto without departing from the spirit and scope of the invention as defined by the appended claims.

What is claimed is:

1. A method for fastening a screw along a lock axis, the screw having threads with a major and a minor diameter, to a nut having threads positioned along an opening at the minor diameter, the method comprising:

rotationally biasing the nut to the lock axis with a spring-loaded biasing mechanism;

pushing the screw through the opening of the nut to apply an insertion force from the screw threads to the nut threads;

moving the nut threads with the insertion force to position the nut threads at the major diameter by rotating the nut from the lock axis to a slip axis, the opening widened along the slip axis to have the major diameter, the insertion force overcoming the rotational bias of the nut to the lock axis by the spring-loaded biasing mechanism;

inserting the screw through the opening with the nut threads forced to the major diameter; and returning the nut threads to the minor diameter to engage the screw threads and fasten the screw to the nut, the nut biased back to the lock axis by the spring-loaded biasing mechanism.

* * * * *